United States Patent
Zandbergen et al.

(10) Patent No.: US 9,333,824 B2
(45) Date of Patent: May 10, 2016

(54) INDEPENDENT WHEEL SUSPENSION FOR THE DRIVEN WHEELS OF A VEHICLE

(71) Applicant: FORD GLOBAL TECHNOLOGIES, LLC, Dearborn, MI (US)

(72) Inventors: Paul Zandbergen, Plombieres (BE); Daniel Mainz, Herzogenrath (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/308,410

(22) Filed: Jun. 18, 2014

(65) Prior Publication Data
US 2014/0375013 A1     Dec. 25, 2014

(30) Foreign Application Priority Data

Jun. 19, 2013 (DE) .......................... 10 2013 211 458

(51) Int. Cl.
*B60G 3/20* (2006.01)
*B62D 17/00* (2006.01)

(52) U.S. Cl.
CPC *B60G 3/20* (2013.01); *B62D 17/00* (2013.01); *B60G 2200/18* (2013.01); *B60G 2200/44* (2013.01); *B60G 2200/462* (2013.01); *B60G 2204/15* (2013.01)

(58) Field of Classification Search
CPC ................. B60G 3/20; B60G 2200/18; B60G 2200/462; B60G 2200/44; B60G 2204/15; B60G 7/006; B62D 17/00
See application file for complete search history.

(56) References Cited

U.S. PATENT DOCUMENTS

| 5,048,860 | A | * | 9/1991 | Kanai et al. ............... 280/86.757 |
| 5,292,149 | A | * | 3/1994 | Luger ....................... B60G 3/26 |
| | | | | 280/5.521 |
| 7,431,315 | B2 | * | 10/2008 | Jargowsky et al. ..... 280/124.128 |
| 7,766,345 | B2 | * | 8/2010 | Hakui et al. ................. 280/5.521 |
| 7,784,806 | B2 | * | 8/2010 | Schmidt et al. ......... 280/124.134 |
| 7,891,684 | B1 | * | 2/2011 | Luttinen et al. ......... 280/124.136 |
| 7,896,360 | B2 | * | 3/2011 | Buma ......................... 280/5.511 |
| 7,963,538 | B2 | * | 6/2011 | Roland et al. ........... 280/124.138 |
| 8,041,479 | B2 | * | 10/2011 | Buma .............................. 701/37 |
| 8,267,416 | B2 | * | 9/2012 | Allen et al. ............ 280/124.135 |
| 2002/0050694 | A1 | * | 5/2002 | Mikasa et al. ............ 280/86.758 |
| 2010/0276896 | A1 | * | 11/2010 | Sano ......................... 280/5.509 |
| 2011/0291376 | A1 | | 12/2011 | Allen et al. |

FOREIGN PATENT DOCUMENTS

EP        1 937 498 B1     3/2009

\* cited by examiner

*Primary Examiner* — Paul N Dickson
*Assistant Examiner* — Timothy Wilhelm
(74) *Attorney, Agent, or Firm* — Jones Robb, PLLC; Raymond L. Coppiellie

(57) ABSTRACT

An independent wheel suspension for the driven wheels of a vehicle is disclosed. The suspension includes a wheel carrier for rotatably supporting a wheel of the vehicle. The wheel carrier is connected to a torsion-resistant transverse link. The torsion-resistant transverse link is connected to the vehicle structure via two structure-side link bearings and to the wheel carrier via two wheel-carrier-side link bearings. The wheel carrier also is connected to two additional transverse links, each of the additional transverse links being connected to the vehicle structure and to the wheel carrier. The suspension also includes a carrier spring supported on the vehicle structure and on the wheel carrier, wherein the carrier spring is arranged in front of a wheel center axis and the at least two additional transverse links are arranged behind the wheel axis.

16 Claims, 5 Drawing Sheets

INDEPENDENT WHEEL SUSPENSION FOR THE DRIVEN WHEELS OF A VEHICLE

CROSS REFERENCE TO RELATED APPLICATIONS

This application claims priority to German Application No. 102013211458.3, filed on Jun. 19, 2013, the entire content of which is incorporated by reference herein.

TECHNICAL FIELD

The present disclosure relates generally to an independent wheel suspension for the driven wheels of a vehicle, in particular for the driven rear wheels of a motor vehicle.

BACKGROUND

Independent wheel suspensions for non-driven wheels of a motor vehicle are known. Such suspensions are typically very heavy. Attempts to decrease the weight of such suspension have been made. For example, EP 1 937 498 B1, discloses a wheel suspension in the form of a trapezoidal link axle. Another trapezoidal link axle is disclosed, for example, in U.S. Pat. No. 7,784,806 B2. Such suspensions, however, make use of conventional torsionally stiff transverse links, which due to their H-shape and the resultant positioning of elements of the suspension relative to the H-shape, results in additional weight in a wheel suspension and/or a less than compact construction of the wheel suspension.

With this in mind, the object of the present disclosure is to provide a to provide an independent wheel suspension for the driven wheels of a vehicle, in particular for the driven rear wheels of a motor vehicle, which suspension is more compact in comparison with the known wheel suspensions. Furthermore, the wheel suspension is intended to enable the driven wheels to be steered.

SUMMARY

In accordance with various exemplary embodiments, the present disclosure provides an independent wheel suspension for the driven wheels of a vehicle. The suspension comprises a wheel carrier for rotatably supporting a wheel of the vehicle about a wheel center axis. The wheel carrier is connected in an articulated manner to a torsion-resistant transverse link. The torsion-resistant transverse link is connected to the vehicle structure in an articulated manner via two structure-side link bearings and is connected to the wheel carrier in an articulated manner via two wheel-carrier-side link bearings. The suspension also comprises at least two additional transverse links. The wheel carrier is connected in an articulated manner to the two additional transverse links. Each of the additional transverse links is connected to the vehicle structure in an articulated manner via a structure-side link bearing and is connected to the wheel carrier in an articulated manner via a wheel-carrier-side link bearing. A carrier spring is supported on the vehicle structure and on the wheel carrier. The carrier spring is arranged in front of the wheel center axis in a longitudinal direction of the vehicle, and the at least two additional transverse links are arranged behind the wheel axis in a longitudinal direction of the vehicle.

In accordance with another exemplary embodiment of the present disclosure, an independent wheel suspension comprises a wheel carrier for rotatably supporting a wheel of the vehicle, a torsion-resistant transverse link, a toe link, a camber link, and a shock absorber. Each of the links is articulately connected to a vehicle structure at a first end and of the link and to the wheel carrier at a second end of the link. The toe link is positioned substantially behind the torsion-resistant link in the longitudinal direction of the vehicle and the camber link is positioned above the torsion-resistant link. The shock absorber is positioned between the camber link and the toe link and is supported on the vehicle structure and on one of the torsion-resistant transverse link and the wheel carrier.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
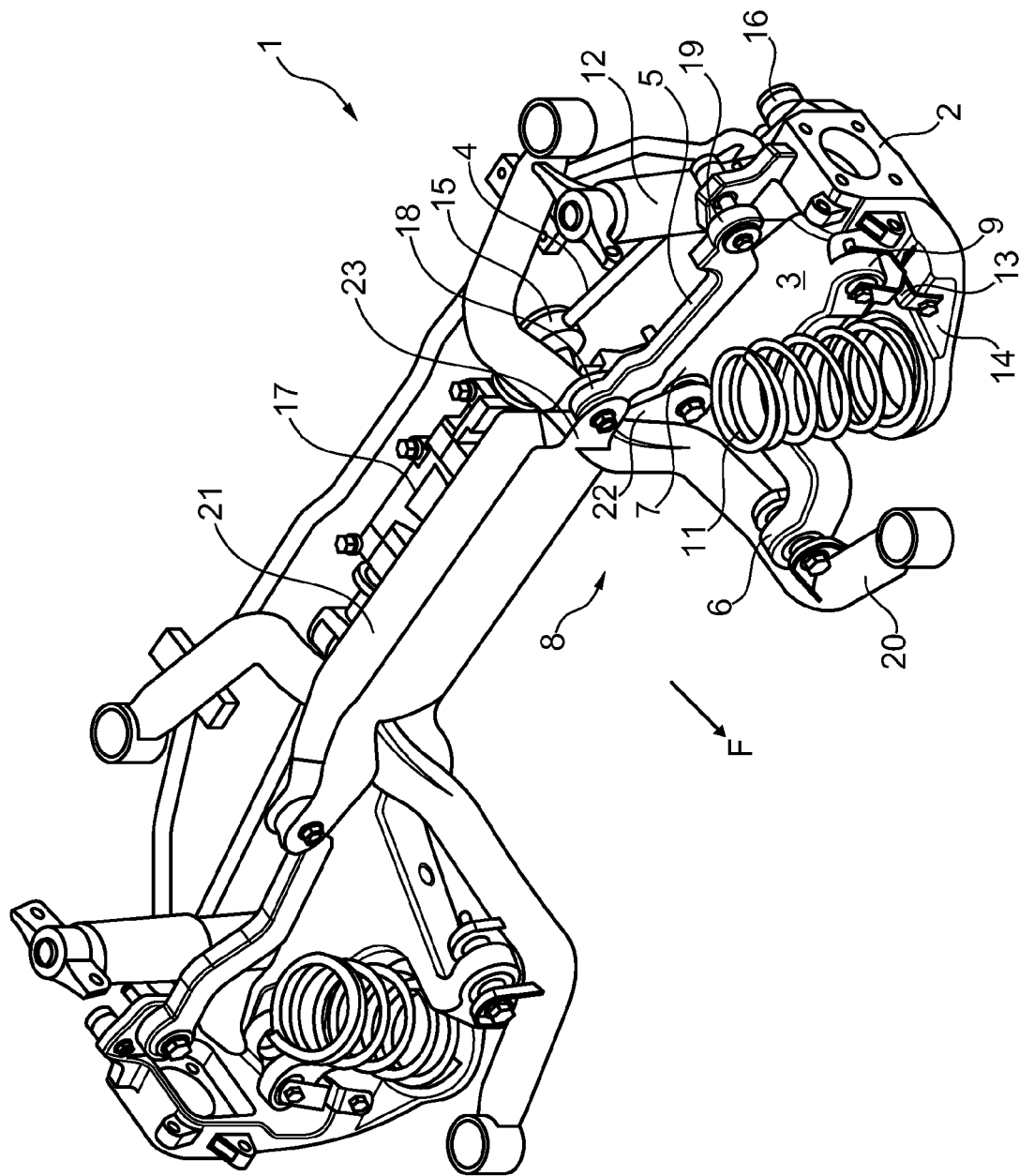
FIG. 1 is a perspective view of a first embodiment of a wheel suspension according to the present disclosure, when viewed in an oblique manner from the front.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure. It should be noted that the features set out individually in the following description can be combined with each other in any technically advantageous manner and set out other embodiments of the present disclosure.

The terms "in front of" and "behind" used herein to define a relative position of one wheel suspension component relative to another. As used herein, "in front of" and "behind" relate to a relative arrangement of the wheel suspension components in the longitudinal direction of the vehicle or in a forward travel direction of the vehicle. For example, a wheel suspension component that is arranged in front of another component is located closer to the vehicle front than the other component. Similarly, the terms "forward" and "rearward" are used herein to describe a relative position of one wheel suspension component relative to another. As used herein, "forward" and "rearward" relate to a relative arrangement of the wheel suspension components in the longitudinal direction of the vehicle (i.e., a front or rear of the vehicle). These components may also be either "forward" or "rearward" in the longitudinal direction of the vehicle relative to a direction of travel of the vehicle. Thus, for example, when comparing components, the component that is advancing first in the direction of travel of the vehicle is the "forward" component and the component that is advancing after the first component, because of its relative position "behind" the first component in the direction of travel, is the "rearward" component.

In a similar manner, the terms "above" and "below" used herein relate to a positional description of two wheel suspension components relative to one another in a vertical direction of the vehicle. For example, a vehicle suspension component that is arranged below another component is located closer to a roadway plane of the vehicle than the component that is above it. Furthermore, the terms "inner" and "outer" refer to a relative position of the wheel suspension components in the transverse direction of the vehicle. For example, a wheel suspension component that is arranged inward relative to another (outer) wheel suspension component is located closer to a longitudinal center plane of the vehicle than the outer component.

In accordance with the present teachings, an independent wheel suspension for the driven wheels of a motor vehicle, in particular for the driven rear wheels of a motor vehicle, comprises a wheel carrier which rotatably supports the wheel about a wheel center axis. The wheel carrier is articulated to a first transverse link, which is torsion-resistant, and to at least two additional transverse links. The torsion-resistant transverse link, which is also referred to herein as a trapezoidal link or an H-link (due to its shape), is articulated to the vehicle structure by two structure-side link bearings. The torsion-resistant trapezoidal link is articulated to the wheel carrier by two wheel-carrier-side link bearings. Each of the two additional transverse links is articulated to the vehicle structure by a structure-side link bearing and is articulated to the wheel carrier by a wheel-carrier-side link bearing. The articulated connection of the transverse links to the vehicle structure may be a direct connection or indirect connection, for example, with an auxiliary frame or subframe being interposed.

The wheel suspension further comprises a carrier spring supported on the vehicle structure and on the wheel carrier. The carrier spring is arranged in front of the wheel center axis and the additional transverse links are arranged behind the wheel center axis in a longitudinal direction of the vehicle. A drive shaft is rotatably supported on the wheel carrier and extends along the wheel center axis in the installed state of the wheel suspension. In accordance with the present teachings, the arrangement of the transverse links, the carrier spring, and the drive shaft substantially enables a wheel suspension that is compact in the vertical direction of the vehicle since the wheel suspension components can generally be arranged lower than in conventional wheel suspensions and this arrangement in the vertical direction of the vehicle is not limited by the path of the drive shaft. Consequently, for example, more space is available for the base of the vehicle.

According to an exemplary embodiment of the present disclosure, the connection line of the structure-side link bearings of the torsion-resistant transverse link (i.e., an imaginary line passing though the link bearings on the vehicle body structure side) and the connection line of the wheel-carrier-side link bearings of the torsion-resistant transverse link (i.e., an imaginary line passing though the link bearings on the wheel carrier side) intersect with each other in front of the wheel carrier in the longitudinal or travel direction of the vehicle when viewed in a plan view from above.

In accordance with another exemplary embodiment of the present disclosure, the carrier spring is supported on an extension arm in the link plane of the torsion-resistant transverse link or in a vertical direction of the vehicle therebelow, the extension arm being arranged on the wheel carrier. In this manner, in particular in the vertical direction of the vehicle, a compact wheel suspension can be produced.

As disclosed herein, the forward wheel-carrier-side link bearing of the torsion-resistant transverse link is connected to the wheel carrier with an intermediate or integral link being interposed. This increases the production complexity of the wheel suspension slightly, but does improve steerability, in particular with regard to the application of force. That is, rotatability about a vertical shaft of the wheel carrier connected to the torsion-resistant transverse link is made easier.

In accordance with another aspect of the present disclosure, the integral link extends substantially parallel with a vertical direction of the vehicle. The forward wheel-carrier-side link bearing of the torsion-resistant transverse link, which is connected to the integral link, is arranged above the connection location of the integral link on the wheel carrier, the integral link connected to an extension arm of the wheel carrier in order to support the carrier spring.

In accordance with an alternative embodiment of the present disclosure, both the forward and rearward wheel-carrier-side link bearings of the torsion-resistant transverse link are directly connected to the wheel carrier. In particular, the forward wheel-carrier-side link bearing of the torsion-resistant transverse link is directly connected to the wheel carrier in an integral bearing bush. In comparison with the embodiment having an integral link, the integral bearing bush slightly simplifies the structure of the wheel suspension and provides a slightly lighter structure. However, the integral bearing bush requires slightly greater application of force for steering, that is to say, to rotate about a vertical axis of the wheel carrier which is connected to the torsion-resistant transverse link.

In accordance with another exemplary embodiment of the present disclosure, one of the two additional transverse links acts as a toe link and is arranged behind the torsion-resistant transverse link in the longitudinal direction of the vehicle. The other of the two transverse links acts as a camber link and is arranged above the link plane of the torsion-resistant transverse link. Accordingly, both the toe link and the camber link are in the form of transverse links for receiving transverse forces of the wheel suspension. That is, the two links are oriented substantially in parallel with the transverse direction of the vehicle. This allows a configuration of the wheel suspension with a relatively high level of resilience of the wheel suspension in the longitudinal direction of the vehicle. This configuration is advantageous with regard to the hardness properties of the wheel suspension in the event of impacts. For example, such a configuration does not allow an excessive kinematic inward movement of the wheel suspension in the direction of a toe-in action, for example, in the event of a braking operation, as would be the case with a toe link substantially oriented in the longitudinal direction of the vehicle.

In accordance with another aspect of the present disclosure, the toe link may be moved in a substantially transverse direction of the vehicle by an actuator. Active rotation of the wheel carrier about a vertical axis is thereby enabled and, consequently, active steering of the wheel which is connected to the wheel carrier of the wheel suspension and which is driven by the drive shaft also is enabled.

In accordance with the present teachings, a shock absorber is supported on the vehicle structure and on the torsion-resistant transverse link or on the wheel carrier. The shock absorber is arranged in a space-saving manner between the two additional transverse links, in particular, between the toe link and the camber link.

In accordance with the present disclosure, the structure-side link bearings of all of the transverse links are ultimately connected to the vehicle structure by an auxiliary frame. The auxiliary frame is formed from a longitudinal strut, which extends substantially in the longitudinal direction of the vehicle, and a transverse carrier, which extends substantially transversely relative to the longitudinal strut. The transverse carrier carries the longitudinal strut. In the region of the longitudinal strut, the transverse carrier comprises a forked end portion including first and second ends. One end of the forked end portion is arranged below the longitudinal strut in the vertical direction of the vehicle and the other end is arranged above the longitudinal strut in the vertical direction of the vehicle. The torsion-resistant transverse link is articulated to one of these two fork-like ends of the transverse carrier by one of the two structure-side link bearings and one of the additional transverse links is articulated to the other end of the two fork-like ends of the transverse carrier by the structure-side link bearing thereof. This embodiment enables both a link bearing of the torsion-resistant transverse link and a link bearing of another transverse link to be directly articulated to the transverse carrier. Consequently, the provision of generally clamp-like connection elements for connecting the transverse links to the longitudinal strut can be dispensed with, thereby simplifying the structure of the wheel suspension and reducing its overall weight.

Turning now to the drawings, FIG. 1 is a perspective view of an exemplary embodiment of a wheel suspension 1 for the driven wheels (not shown), in particular the rear wheels, of a vehicle such as a motor vehicle (not shown). In FIG. 1, the forward travel direction of the vehicle, which at the same time corresponds to a longitudinal direction of the vehicle, is indicated by a directional arrow F. Furthermore, in FIG. 1, both the right-hand and the left-hand side of the same vehicle axle is illustrated. Since both wheel suspension sides are constructed in the same manner, the following description is limited for reasons of clarity to the explanation of the left-hand-side wheel suspension components when viewed in the travel direction. However, this description also applies in the same manner to the right-hand-side wheel suspension components.

As shown in FIG. 1, the wheel suspension 1 comprises a wheel carrier 2, which rotatably supports a wheel (not shown) about a wheel center axis (not shown). Wheel carrier 2 is articulated to a torsion-resistant transverse link 3 and to at least two other transverse links 4 and 5. The torsion-resistant transverse link 3 is articulated to the vehicle structure by two structure-side link bearings 6 and 7 or to an auxiliary frame 8 which is connected to the vehicle structure and to the wheel carrier 2 by two wheel-carrier-side link bearings 9 and 10 (link bearing 10 can be seen in FIG. 2). The link bearings 6, 7, 9 and 10 may, for example, be constructed as conventional rubber/metal sleeve bearings. Furthermore, the exemplary embodiment of the wheel suspension 1 shown in FIG. 1 comprises a carrier spring 11 and a shock absorber 12. The carrier spring 11 is supported on the vehicle structure (not shown) and on the wheel carrier 2. The shock absorber 12 is supported on the vehicle structure and on the trapezoidal link 3.

FIG. 1 shows the front or forward wheel-carrier-side link bearing 9 of the torsion-resistant transverse link 3 connected to the wheel carrier 2 with an intermediate or integral link 13 being interposed. In the illustrated exemplary embodiment of the wheel suspension 1, the integral link 13 extends substantially parallel with a vertical direction of the vehicle. Furthermore, the wheel-carrier-side link bearing 9 of the torsion-resistant transverse link 3, which bearing is connected to the integral link 13, is arranged above the connection location of the integral link 13 to the wheel carrier 2. In particular, the integral link 13 is supported with its lower end on an extension arm 14 of the wheel carrier 2. Extension arm 14 receives and supports the carrier spring 11. The use of the integral link 13 for connecting the wheel-carrier-side link bearing 9 to the wheel carrier 2 or the extension arm 14 improves ease of steering, that is to say, rotatability about a vertical axis of the wheel carrier 2 which is connected to the torsion-resistant transverse link 3.

Figure 2:
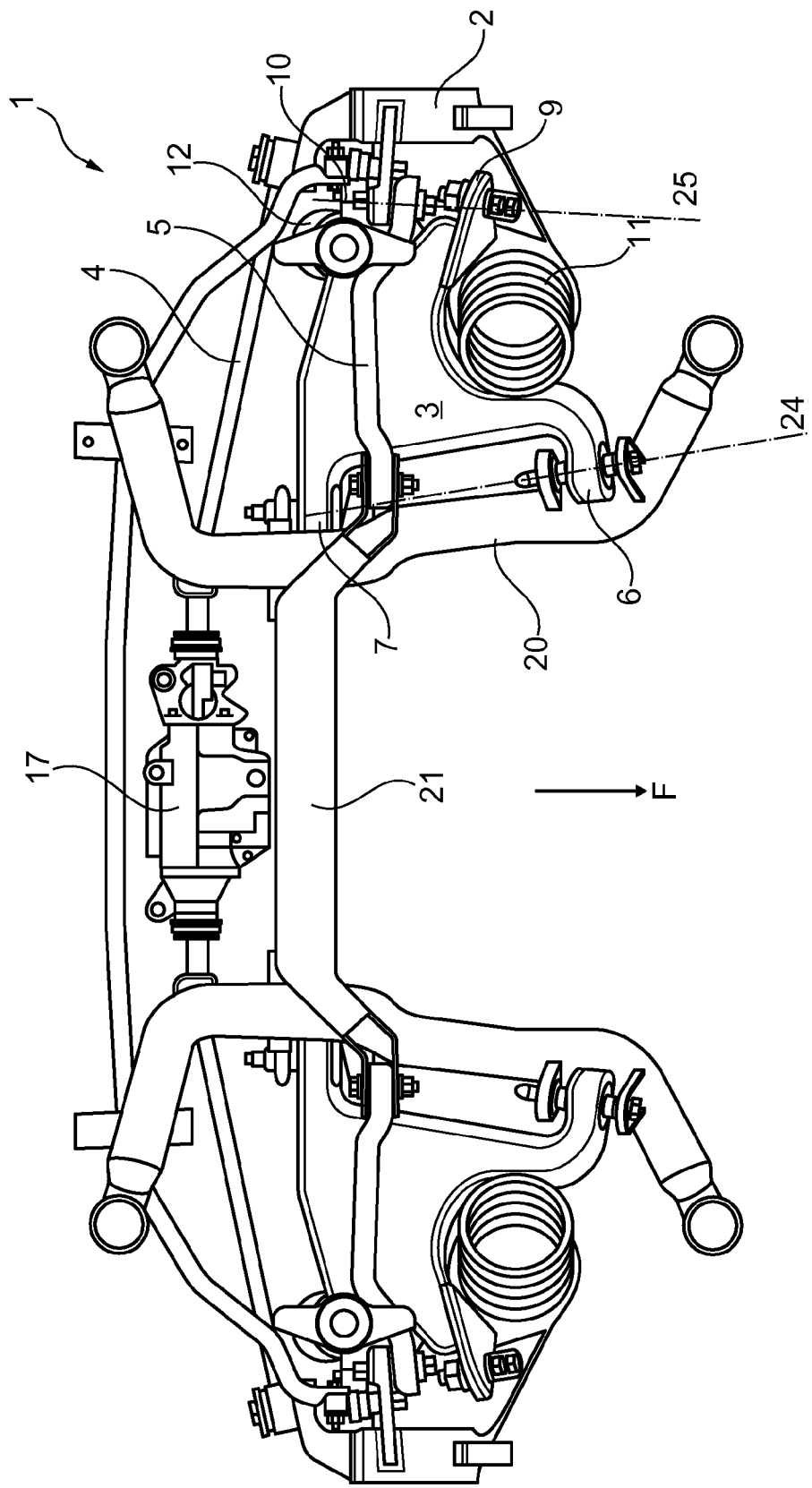
FIG. 2 is a top view of the wheel suspension of FIG. 1.
Figure 3:
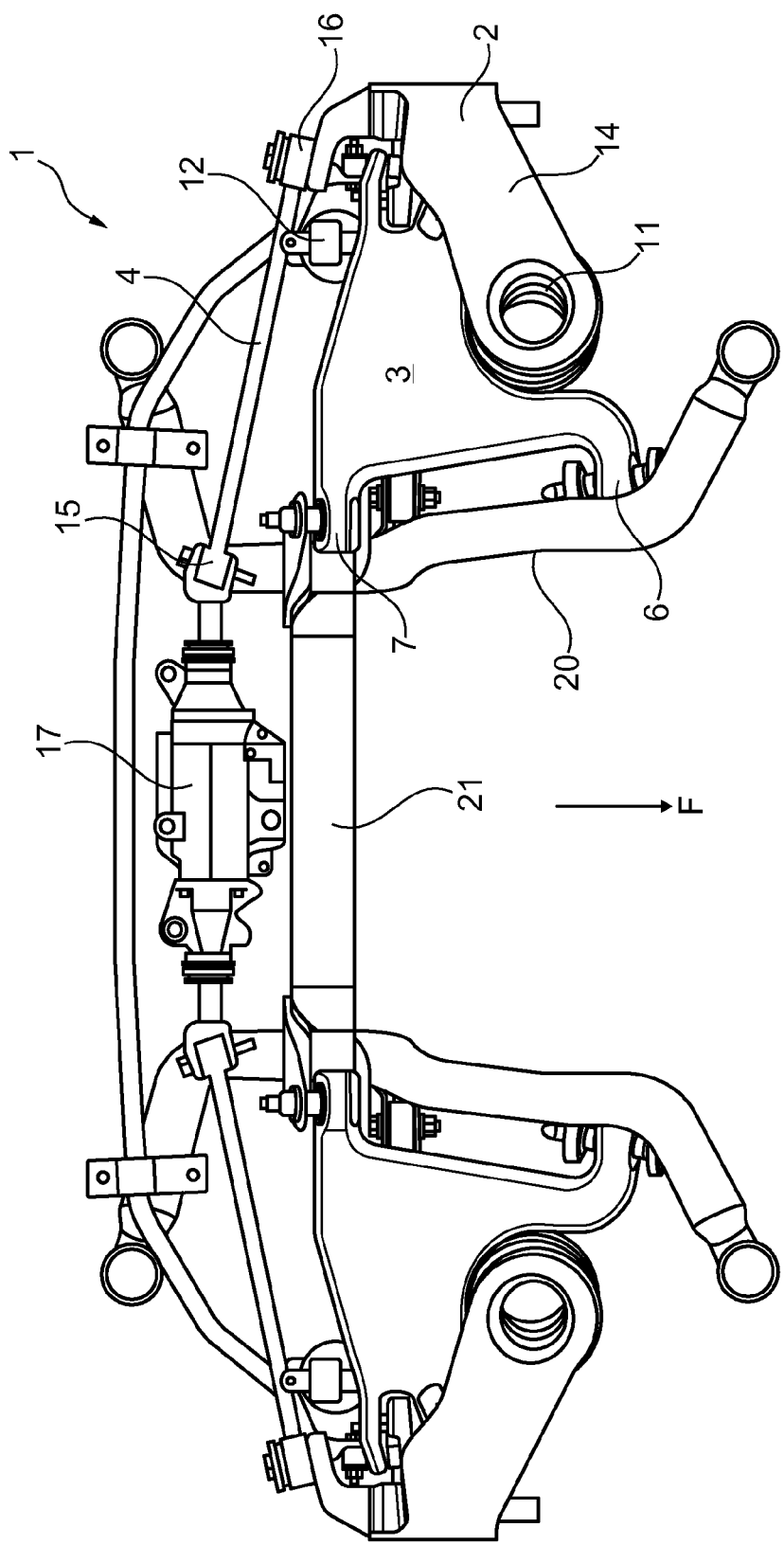
FIG. 3 is a bottom view of the wheel suspension of FIG. 1.
Figure 5:
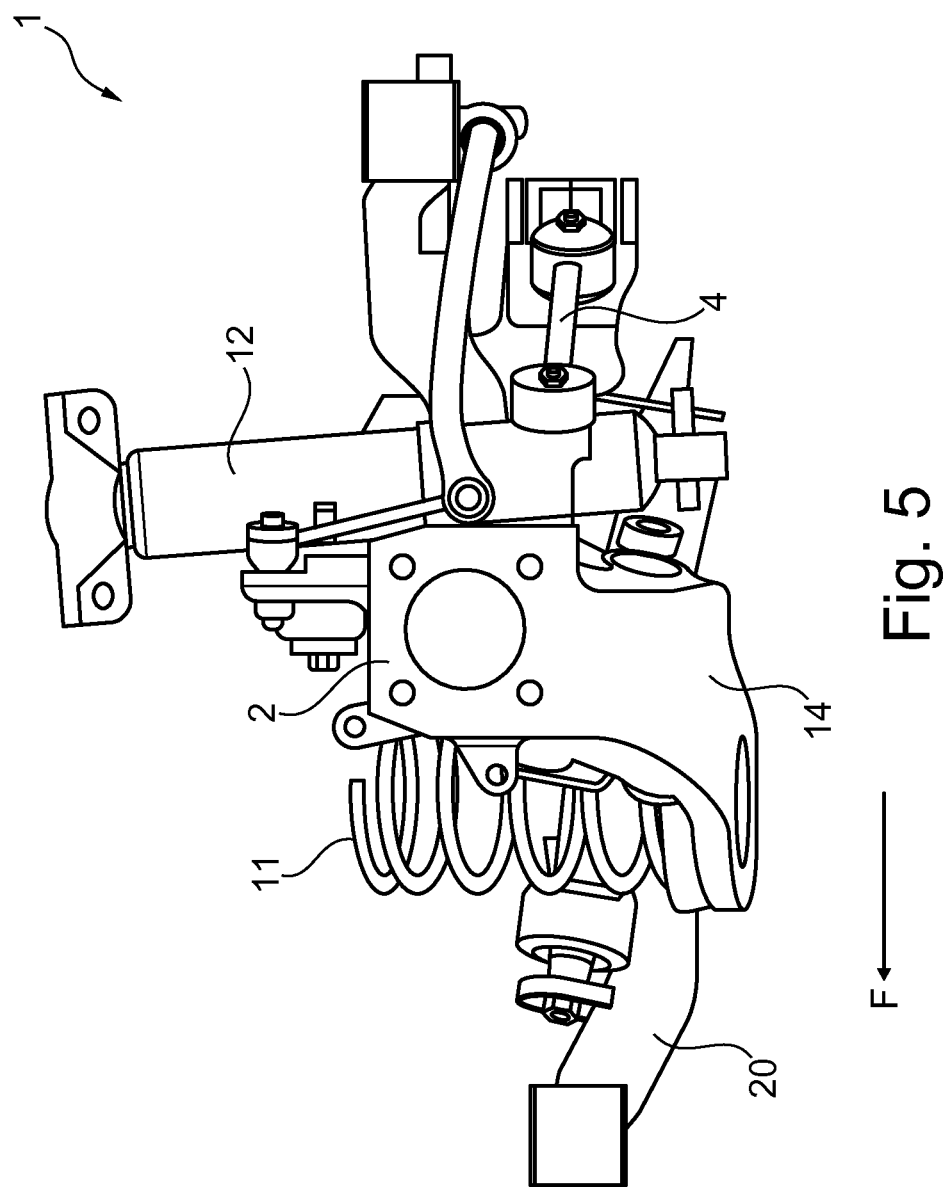
FIG. 5 is a side view of the wheel suspension of FIG. 1.

Shown best in FIGS. 2, 3, and 5, the transverse link 4 acts as a toe link and extends behind the shock absorber 12. The toe link 4 is articulated by a structure-side link bearing 15 connected to the vehicle structure or to the auxiliary frame 8 and by a wheel-carrier-side link bearing 16 connected to the wheel carrier 2. The link bearings 15 and 16 may, for example, be constructed as conventional rubber/metal sleeve bearings. In the embodiment of the wheel suspension 1 illustrated in FIG. 1, the toe link 4 is articulated at the structure side to an actuator 17. Actuator 17 is supported on the auxiliary frame 8. The actuator 17, for example a linear actuator, serves to move the toe link 4 substantially in a transverse direction of the vehicle in order to actively rotate or steer the wheel carrier 2, connected to the transverse link 3, about a vertical axis. As can be seen in FIG. 1, the toe link 4 extends behind the transverse link 3 when viewed in the longitudinal direction of the vehicle or travel direction F.

As shown in FIG. 1, a single actuator 17 is provided for the illustrated vehicle axle. The actuator 17, for example, drives a toothed rod (not shown), to which the respective toe links 4 are articulated and can consequently be moved by the actuator 17 in a transverse direction of the vehicle. The toe links 4 are indirectly connected to the vehicle structure or to the auxiliary frame 8 via the toothed rod and the actuator 17.

In front of the toe link 4, the transverse link 5, which acts as a camber link, extends in the longitudinal direction of the vehicle or travel direction of the vehicle F. Camber link 5 also is articulated to the vehicle structure or to the auxiliary frame 8 by a structure-side link bearing 18 and to the wheel carrier 2 by a wheel-carrier-side link bearing 19. The link bearings 18 and 19 may, for example, be constructed as conventional rubber/metal sleeve bearings. As shown in FIG. 1, the camber link 5 extends above the link plane of the transverse link 3 and behind the wheel center axis, which is defined by the wheel carrier 2, in the longitudinal direction of the vehicle or travel direction of the vehicle F. Consequently, a drive shaft (not shown) for driving the wheel, the shaft extending along the wheel center axis and connected to the wheel carrier 2, extends in the longitudinal direction of the vehicle F in front of the camber link 5. In the exemplary embodiment of the wheel suspension 1, the shock absorber 12 is arranged between the toe link 4 and the camber link 5. The carrier spring 11 is arranged in the longitudinal direction of the vehicle F in front of the camber link 5 and also in front of the wheel center axis or the drive shaft (not shown).

As already mentioned, the transverse links 3, 4 and 5 and, in particular, the structure-side link bearings 6, 7, 15 and 18 thereof, are not connected directly to the vehicle structure, but instead are connected via the auxiliary frame 8 which is connected to the vehicle structure. As shown in FIG. 1, the auxiliary frame 8 of the wheel suspension 1 is formed from a longitudinal strut 20, which extends substantially in the longitudinal direction of the vehicle or travel direction of the vehicle F, and a transverse carrier 21, which extends substantially transversely relative to the longitudinal strut 20 and which carries the longitudinal strut 20. In the region of the longitudinal strut 20, the transverse carrier 21 has two fork-like ends 22 and 23. The end 22 is arranged below the longitudinal strut 20 in the vertical direction of the vehicle and the end 23 is arranged above the longitudinal strut 20. As can be seen clearly in FIG. 1, the torsion-resistant transverse or trapezoidal link 3 of the exemplary wheel suspension 1 is articulated with its rear link bearing 7 directly connected to the lower end 22 of the transverse carrier 21 and the transverse link 5 is articulated with its structure-side link bearing 18 directly connected to the upper end 23 of the transverse carrier 21. Consequently, the clamp-like connection elements for connecting the structure-side link bearings 7 and 18 of the transverse links 3 and 5 to the longitudinal strut 20 can be dispensed with, simplifying the entire structure of the wheel suspension 1 and reducing its weight in comparison to conventional wheel suspensions.

FIG. 2 is a plan view of the wheel suspension 1 shown in FIG. 1. FIG. 2 shows that the connection line 24 (an imaginary line extending through an axis of articulation) of the structure-side link bearings 6 and 7 of the torsion-resistant transverse or trapezoidal link 3 and the connection line 25 (an imaginary line extending through an axis of articulation) of the wheel-carrier-side link bearings 9 and 10 of the trapezoidal link 3 intersect with each other in front of the wheel carrier 2 in the longitudinal direction of the vehicle or travel direction of the vehicle F.

Furthermore, in FIG. 2, the two additional transverse links 4 and 5 are shown. The transverse link 4 (toe link) is arranged behind the torsion-resistant transverse or trapezoidal link 3 in the longitudinal direction of the vehicle or travel direction of the vehicle F. The transverse link 5 (camber link) is arranged above the link plane of the torsion-resistant transverse or trapezoidal link 3 in the vertical direction of the vehicle. In particular, both transverse links 4 and 5 are arranged behind the wheel center axis (not shown) or the drive shaft (not shown) which drives the wheel, whereas the carrier spring 11 is arranged in front of the wheel center axis or the drive shaft. As also shown, the shock absorber 12 is arranged between the camber link 5 and the toe link 4.

The two transverse links 4 and 5 are arranged so as to absorb transverse forces acting only in the transverse direction of the vehicle, that is, the toe link 4 and the camber link 5 are both substantially oriented in the transverse direction of the vehicle.

Figure 4:
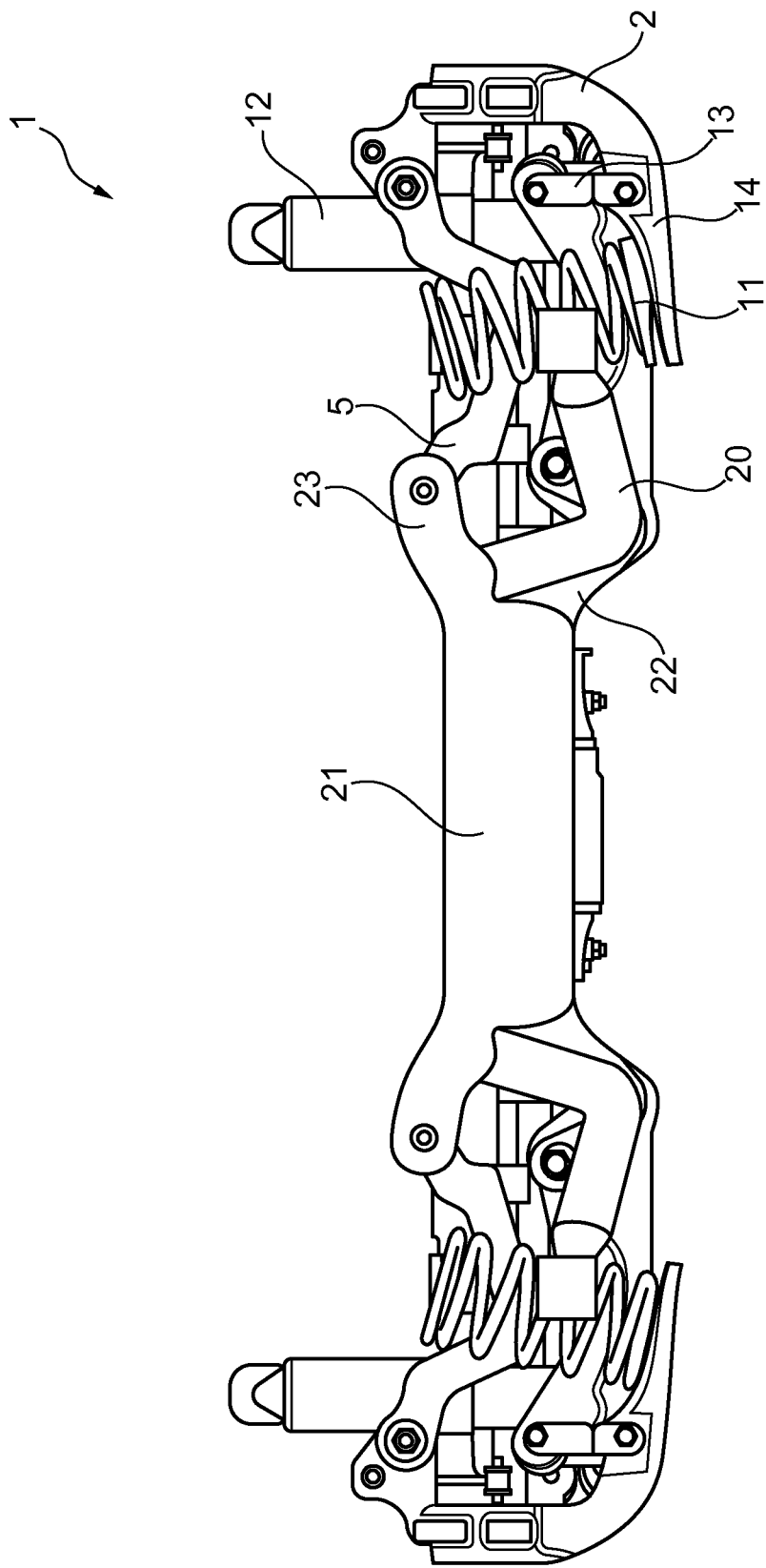
FIG. 4 is a front view of the wheel suspension of FIG. 1.

FIG. 3 is a bottom view of the wheel suspension 1 of FIG. 1. FIG. 3 shows the extension arm 14 of the wheel carrier 2, on which arm the carrier spring 11 is supported in the link plane of the transverse link 3, or therebelow. Additional views of the exemplary embodiment of the wheel suspension 1 are illustrated in FIGS. 4 and 5. FIG. 4 is a front view of the wheel suspension 1 of FIG. 1 and FIG. 5 is a side view of the wheel suspension 1 of FIG. 1.

The above-described independent wheel suspension for the driven wheels of a vehicle, in particular for the driven rear wheels of a motor vehicle, is not limited to the exemplary embodiment disclosed herein, but also includes other embodiments which function in the same manner. For instance, the link bearings of the torsion-resistant transverse or trapezoidal link 3, which are configured as rubber/metal sleeve bearings and, in particular, the rear wheel-carrier-side link bearing 10 of the trapezoidal link 3 can, for example, also be constructed as ball bearings. Furthermore, in place of the indirect connection between the front wheel-carrier-side link bearing 9 of the transverse or trapezoidal link 3 and the wheel carrier 2, with the integral link 13 being interposed, a direct connection may also be provided by means of an integral bearing bush. Furthermore, the active articulation illustrated in the figures of the wheel suspension 1 by means of the one actuator 17 can also be carried out by means of an active transverse or toe link 4. In this instance, the actuator 17 can be dispensed with and the length of the transverse or toe link 4 is changed in the transverse direction of the vehicle by means of an actuator which is integrated in the toe link 4. Consequently, at least a portion of the transverse or toe link 4 continues to move in a transverse direction of the vehicle and consequently provides active steering of the wheel carrier 2.

In accordance with one exemplary embodiment, the wheel suspension is used on a rear axle of a rear-drive motor vehicle, the rear wheels of the motor vehicle being steerable.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. An independent wheel suspension for the driven wheels of a vehicle comprising:
    a wheel carrier for rotatably supporting a wheel of the vehicle about a wheel center axis, the wheel carrier being connected in an articulated manner to a torsion-resistant transverse link, the torsion-resistant transverse link being connected to a vehicle structure in an articulated manner via two structure-side link bearings and being connected to the wheel carrier in an articulated manner via two wheel-carrier-side link bearings,
    an auxiliary frame comprising a transverse carrier, wherein the torsion-resistant transverse link is directly connected to the transverse carrier via one of the two structure-side link bearings;
    at least two additional transverse links, the wheel carrier being connected in an articulated manner to the two additional transverse links, each of the additional transverse links being connected to the vehicle structure in an articulated manner via a structure-side link bearing and being connected to the wheel carrier in an articulated manner via a wheel-carrier-side link bearing; and
    a carrier spring supported on the vehicle structure and on the wheel carrier, wherein the carrier spring is arranged in front of the wheel center axis in a longitudinal direction of the vehicle, and wherein the at least two additional transverse links are arranged behind the wheel axis in the longitudinal direction of the vehicle;
    wherein a connection line of the structure-side link bearings of the torsion-resistant transverse link intersects with a connection line of the wheel-carrier-side link bearings of the torsion-resistant transverse link in front of the wheel carrier in the longitudinal direction of the vehicle.

2. The wheel suspension as claimed in claim 1, wherein the carrier spring is supported on an extension arm, which is arranged on the wheel carrier, in a link plane of the torsion-resistant transverse link or therebelow.

3. The wheel suspension as claimed in claim 1, wherein a front wheel-carrier-side link bearing of the torsion-resistant transverse link is connected to the wheel carrier with an integral link being interposed therebetween.

4. The wheel suspension as claimed in claim 3, wherein the integral link extends substantially parallel with a vertical direction of the vehicle and wherein the wheel-carrier-side link bearing of the torsion-resistant transverse link, the bearing being connected to the integral link, is arranged above a connection location of the integral link on the wheel carrier.

5. The wheel suspension as claimed in claim 1, wherein both wheel-carrier-side link bearings of the torsion-resistant transverse link are directly connected to the wheel carrier.

6. The wheel suspension as claimed in claim 1, wherein one of the at least two additional transverse links functions substantially as a toe link and is arranged behind the torsion-resistant transverse link in the longitudinal direction of the vehicle and the other of the at least two transverse links functions substantially as a camber link and is arranged above a link plane of the torsion-resistant transverse link.

7. The wheel suspension as claimed in claim 6, wherein the toe link is movable in a transverse direction of the vehicle by an actuator.

8. The wheel suspension as claimed in claim 1, further comprising a shock absorber arranged between the at least two additional transverse links, the shock absorber being supported on the vehicle structure and on the torsion-resistant transverse link or on the wheel carrier.

9. The wheel suspension as claimed in claim 8, wherein one of the at least two additional transverse links functions substantially as a toe link and is arranged behind the torsion-resistant transverse link in the longitudinal direction of the vehicle and the other of the at least two transverse links functions substantially as a camber link and is arranged above a link plane of the torsion-resistant transverse link.

10. The wheel suspension as claimed in claim 1, wherein the auxiliary frame is formed from a longitudinal strut extending substantially in the longitudinal direction of the vehicle and the transverse carrier extends substantially transverse to the longitudinal strut, wherein the structure side link bearings of each of the transverse links connect to the vehicle structure via the auxiliary frame.

11. The wheel suspension as claimed in claim 10, wherein, in a region of the longitudinal strut, the transverse carrier has a forked end portion with an upper end and a lower end, wherein the lower end is arranged below the longitudinal strut in a vertical direction of the vehicle and the upper end is arranged above the longitudinal strut, wherein the torsion-resistant transverse link is articulated to the lower end by one of the two structure-side link bearings thereof and one of the at least two additional transverse links is articulated to the upper end by the structure-side link bearing thereof.

12. An independent wheel suspension for the driven wheels of a vehicle, the suspension comprising:
    a wheel carrier for rotatably supporting a wheel of the vehicle,
    a torsion-resistant transverse link;
    a toe link;
    a camber link; and
    a shock absorber,
    wherein each of the links is articulatably connected to a vehicle structure at a first end and of the link and to the wheel carrier at a second end of the link, wherein the toe link is positioned substantially behind the torsion-resistant link in a longitudinal direction of the vehicle and the camber link is positioned above the torsion-resistant link, and
    wherein the shock absorber is positioned between the camber link and the toe link and is supported on a vehicle structure and on one of the torsion-resistant transverse link and the wheel carrier;
    an auxiliary frame, the auxiliary frame being formed from a longitudinal strut extending substantially in a longitudinal direction of the vehicle and a transverse carrier extending substantially transversely to the longitudinal strut, wherein each of the torsion-resistant transverse link and one of the camber link and the toe link is connected to the vehicle structure via the auxiliary frame;
    wherein, in a region of the longitudinal strut, the transverse carrier has a forked end portion with an upper end and a lower end, wherein the lower end is arranged below the longitudinal strut in a vertical direction of the vehicle and the upper end is arranged above the longitudinal strut, wherein the torsion-resistant transverse link is articulated to the lower end and the one of the camber link and the toe link is articulated to the upper end by the structure-side link bearing.

13. The wheel suspension as claimed in claim 12, further comprising a carrier spring, wherein the carrier spring is positioned substantially in front of the camber link and the toe link in the longitudinal direction of the vehicle and is supported on the vehicle structure and on the wheel carrier.

14. The wheel suspension as claimed in claim 13, wherein the carrier spring is arranged in front of a wheel center axis of the wheel carrier in the longitudinal direction of the vehicle, and wherein the camber link and the toe link are arranged behind the wheel axis in the longitudinal direction of the vehicle.

15. The wheel suspension as claimed in claim 12, wherein the toe link is movable in a transverse direction of the vehicle by an actuator.

16. An independent wheel suspension for the driven wheels of a vehicle, the suspension comprising:
- a wheel carrier for rotatably supporting a wheel of the vehicle,
- a torsion-resistant transverse link;
- a toe link;
- a camber link; and
- a carrier spring supported on the vehicle structure and on the wheel carrier, wherein the carrier spring is arranged in front of a wheel center axis in a longitudinal direction of the vehicle;
- wherein each of the links is articulatably connected to a vehicle structure at a first end and of the link and to the wheel carrier at a second end of the link, and
- wherein the torsion-resistant transverse link is connected to the wheel carrier via an integral link with a first end connected to the torsion-resistant transverse link and a second end connected to the wheel carrier;
- wherein the integral link extends substantially parallel with a vertical direction of the vehicle, wherein the connection between the torsion-resistant transverse link and the integral link is arranged above the connection between the integral link and the wheel carrier.

* * * * *